US010329935B2

(12) United States Patent
Gaudry et al.

(10) Patent No.: US 10,329,935 B2
(45) Date of Patent: Jun. 25, 2019

(54) GUIDE ARM FOR ELEMENTS HAVING AN ELONGATED SHAPE, IN PARTICULAR FOR A TURBOMACHINE

(71) Applicant: Snecma, Paris (FR)

(72) Inventors: Florian Gaudry, Moissy Cramayel (FR); Ceddric Beljambe, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 433 days.

(21) Appl. No.: 15/105,305

(22) PCT Filed: Dec. 18, 2014

(86) PCT No.: PCT/FR2014/053439
§ 371 (c)(1),
(2) Date: Jun. 16, 2016

(87) PCT Pub. No.: WO2015/092308
PCT Pub. Date: Jun. 25, 2015

(65) Prior Publication Data
US 2016/0348520 A1 Dec. 1, 2016

(30) Foreign Application Priority Data
Dec. 20, 2013 (FR) ...................................... 13 63343

(51) Int. Cl.
F01D 9/06 (2006.01)

(52) U.S. Cl.
CPC .......... F01D 9/065 (2013.01); F05D 2240/14 (2013.01); F05D 2260/30 (2013.01);
(Continued)

(58) Field of Classification Search
CPC . F01D 9/06; F01D 9/065; F01D 25/16; F01D 25/162; F01D 25/164; F01D 25/18;
(Continued)

(56) References Cited

U.S. PATENT DOCUMENTS

| 5,284,011 | A | * | 2/1994 | Von Benken | .............. | F01D 5/26 248/554 |
| 2007/0234706 | A1 | * | 10/2007 | Gagneux | ................. | F01D 9/065 60/226.1 |
| 2009/0104027 | A1 | * | 4/2009 | Duchatelle | .............. | F01D 9/065 415/175 |

FOREIGN PATENT DOCUMENTS

FR 2 875 855 A1 3/2006

* cited by examiner

Primary Examiner — Richard A Edgar
Assistant Examiner — Elton K Wong
(74) Attorney, Agent, or Firm — Blank Rome LLP

(57) ABSTRACT

The invention proposes a guide arm for guiding at least one element having an elongated shape (20), corresponding to a set of cables and/or pipes. The arm comprises an inner cavity (62) opening on the outside of the arm at each of the ends thereof, and in which the elements having an elongated shape can extend.
According to the invention, this structure more particularly comprises:
  a frame (8) comprising a beam (18) linked to means (30, 36, 44) for holding the elements having an elongated shape on the outside and along the beam, and
  a cover (54) of which the walls (56, 58) cover the holding means of the frame, and are engaged with the beam, in such a way as to form the inner cavity in which the elements having and elongated shape extend,
shock-absorbing means (68) being arranged between the means (30, 36, 44) for holding the elements having an elongated shape (20), and the longitudinal walls (56, 58), in
(Continued)

such a way as to reduce and damp the movements of the means for holding in the cavity (62).

11 Claims, 2 Drawing Sheets

(52) U.S. Cl.
CPC ...... *F05D 2260/36* (2013.01); *F05D 2260/38* (2013.01); *F05D 2300/432* (2013.01); *F05D 2300/501* (2013.01); *F05D 2300/611* (2013.01); *Y02T 50/671* (2013.01)

(58) Field of Classification Search
CPC ............. F05D 2240/14; F05D 2260/30; F05D 2260/36; F05D 2300/432
See application file for complete search history.

GUIDE ARM FOR ELEMENTS HAVING AN ELONGATED SHAPE, IN PARTICULAR FOR A TURBOMACHINE

The present invention relates to an arm for guiding elements having an elongated shape, more particularly adapted to the passage of elements having an elongated shape through the stream of a turbomachine such as a turbojet engine or a turboprop engine.

Such a turbomachine generally comprises an annular stream for the circulation of air in the downstream direction of the turbomachine, along and around the axis thereof at successive compression, combustion and turbine stages, with such stream being internally and externally limited by two respective annular shrouds, with air being used for propelling the turbomachine. In addition to the mechanical elements generating the propulsion, the turbomachine comprises pieces of equipment ensuring the correct operation thereof, such as sensors, computers, cooling or lubrication systems. Such pieces of equipment communicate together or with pieces of equipment outside the turbomachine through elements having an elongated shape which generally correspond to cable assemblies, i.e. assemblies of one or more cable(s) or pipes. Specifically, some of such elements having an elongated shape must link pieces of equipment arranged inside the stream with other pieces of equipment arranged outside the stream. The elements having an elongated shape thus have to traverse the stream to link the various pieces of equipment. As the air flow of the stream can generate high constrains and disturbances of such elements having an elongated shape, these have to be appropriately held and guided through the stream.

Using guide arms, radially mounted through the stream, as guides for elements having an elongated shape is known. Such arms can be dedicated to the passage of elements having an elongated shape, but can also be used as structural elements of the turbomachine, or as air flow guide elements. Besides, the French patent application FR 2 906 336 provides for cable assembly positioning and holding rings, which have a rectangular configuration able to surround and hold the cable assemblies on a short length. Such rings further comprise bores for fixing on a wall as that of one of the above-mentioned arms, for instance.

However, the persons skilled in the art do not use such supports to hold the elements having an elongated shape along the guide arms, since such supports, as well as the elements having an elongated shape, would then be exposed to the flows traversing the stream. This would result in such elements being subjected to operational constraints, which would cause the rapid wear thereof and high risk of breaking. Additionally, such supports would protrude on the guide arms which they are mounted on, and the aerodynamic criteria of air circulation would thus not be complied with, which would cause disturbances in the flow and a loss in the performances of the turbomachine.

More advantageously, mounting the means for holding the elements having an elongated shape inside the guide arms in radially running cavities opening at the radial ends thereof is also known, as illustrated in the patent application FR1354716 in the Applicant's name. In this case, it is known to provide therein a trap door giving access to the cavity, to enable mounting such means inside the guide arm. Such a trap door affects the aerodynamic integration of the guide arm into the stream, since it stops the continuity of the guide arm surface. For the same reason, such trap door reduces the rigidity of the guide arm and weakens it. The mounting of the trap door, which uses screws also requires the partial increase of the arm thickness to enable the passage and the positioning of the screws. This increases the global mass of the turbomachine in an undesired manner. Eventually, the mounting described in the above application implies the blind locking of the holding means, when closing the trap door, which leads to uncertainty as to the success of the mounting of the element having an elongated shape in such holding means.

The invention more particularly aims at providing a simple, efficient and cost-effective solution to these problems.

For this purpose, it provides for a guide arm for guiding at least one element having an elongated shape, with each element having an elongated shape corresponding for instance to a cable assembly or a pipe, with said arm extending in a substantially longitudinal direction between two ends, comprising an inner cavity opening on the outside of the arm at each of the ends thereof, and being adapted to accommodate at least one element having an elongated shape extending substantially longitudinally in the cavity, characterized in that said arm consists of two parts extending substantially longitudinally and opposite each other, with one of the two parts being a frame comprising a substantially longitudinal beam linked to means for holding the elements having an elongated shape on the outside and along the beam, and the other one of the two parts being a cover comprising substantially longitudinal walls which cover the frame holding means, and are engaged with the beam, in such a way as to form the inner cavity in which the elements having and elongated shape extend, with shock-absorbing means being arranged pre-stressed between the means for holding the elements having an elongated shape, and the longitudinal walls, in such a way as to reduce and damp the movements of the means for holding in the cavity.

The beam is for instance a structural arm of an intermediate case of a turbomachine.

The invention has a guide arm comprising an inner cavity wherein elements having an elongated shape are protected and guided. Such guide arm may advantageously be mounted through a stream of a turbomachine. Unlike the prior art, such arm does not require a trap door giving access to the cavity. The elements having an elongated shape are thus easily positioned, first in the holding means linked to the beam, and the protective cavity is then formed by the engagement of the cover with the beam. This makes it possible to have a longitudinally continuous and uninterrupted guide arm which better meets the requirements of stiffness and aerodynamics for a turbomachine. Besides, when no trap door is provided, all the walls of the guide arm can have an optimum thickness, without any special dimensional constraint, which makes it possible to save on mass as compared to the prior art. The invention gives the opportunity to use a structural arm of the turbomachine, such as the arm of an intermediate case, as the beam. The guide arm of the invention can thus be optimally integrated in a turbomachine. The shock-absorbing means are particularly adapted when the guide arm is mounted in a turbomachine. As a matter of fact, the environmental rotative movements induce vibrations which may propagate and reach the holding means through the beam. Thanks to the above-mentioned invention, such vibrations are damped and thus do not cause the holding means and the elements having an elongated shape arranged therein to wear. Additionally, such shock-absorbing means provide the successful centering of the means holding the elements having an elongated shape in the cavity, without it being required to form an access to the cavity from the outside for a manual adjustment by a user.

According to one embodiment of the invention, the shock-absorbing means are elastomer pads fixed to the longitudinal walls of the cover. Such pads may also be coated with a friction-resistant material such as polytetrafluoroethylene (PTFE), i.e. the material known under the brand name Teflon® woven in the vicinity of the contact with the frame holding means. The friction-resistant material makes it possible to increase the service life of the pads.

According to a second embodiment of the invention, the shock-absorbing means comprise rippled metal plates fixed to the longitudinal walls of the cover, and the ripple peaks of which rest, on one side, against the longitudinal walls of the cover and, on the other side, against the frame holding means. The metal plates may comprise cut portions so as to increase the flexibility thereof. The rippled metal plates may have a crushing stiffness typically ranging from 0.1 ton/meter et 10 ton/meter.

According to one characteristic of the invention, the shock-absorbing means are fixed to the longitudinal walls of the cover using blind rivets. This enables the mounting of the shock-absorbing means even though the space available on one side of the wall may not enable the passage of a tool.

The blind rivets are preferably engaged from the outside of the cover and have ground heads so as to be flush with the external surface of the cover. The blind rivets cannot thus cause aerodynamic disturbances when a flow circulates about the guide arm.

The frame holding means advantageously comprise at least one member for the passage of elements having an elongated shape comprising holes for the passage of the elements having an elongated shape oriented substantially longitudinally, and which is held tight about the elements having an elongated shape by a collar surrounding said member for the passage of the elements having an elongated shape, with said collar being fixed to a lug extending from the beam.

According to one characteristic of the invention, several lugs are substantially aligned along the beam and are, each, fixed to a collar tightening a member for the passage of the elements having an elongated shape, in such a way as to guide the elements having an elongated shape along the guide arm.

The invention also relates to an assembly consisting of a guide arm as described above, and of at least one element having an elongated shape, characterized in that the guide arm has an aerodynamic configuration for the flowing of a fluid in the downstream direction of the guide arm, substantially perpendicularly to the longitudinal direction, with upstream the guide arm consisting of the frame, the lugs of which extend longitudinally and in the downstream direction, from downstream of the beam, with the elements having an elongated shape being aligned in the downstream direction in the passage members arranged downstream of the lugs, and downstream the guide arm consisting of the cover, the longitudinal walls of which extend in the downstream direction on either side of the members for the passage of the elements having an elongated shape, and are linked to the beam on either side of the lugs, in such a way that the guide arm has two smooth- and uniform-looking external surfaces, substantially mutually parallel, and joined in two upstream and downstream edges of the guide arm.

The invention also relates to a turbomachine, such as a turboprop engine or a turbojet engine, characterized in that it comprises a guide arm as disclosed above.

The guide arm is arranged through a fluid circulation annular stream of the turbomachine, with one of the ends of the guide arm being linked to an inner annular shroud of the stream, and the other end of the guide arm being linked to outer annular shroud of the stream, in such a way as to guide at least one element having an elongated shape, radially between the inside and the outside of the stream, with the frame being arranged upstream of the cover.

The invention will be better understood, and other details, characteristics and advantages thereof will appear upon reading the following description given by way of a non-restrictive example while referring to the appended drawings wherein.

Figure 1:
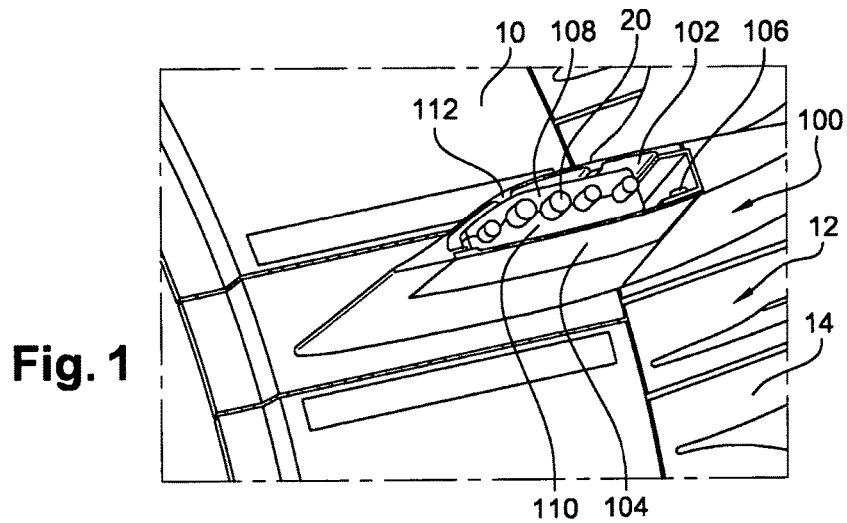
FIG. 1 is a perspective view of an arm for guiding elements having an elongated shape according to the prior art.

Reference is first made to FIG. 1 which shows a stream 10 of a turbomachine wherein a guide arm according to the prior art is mounted. More particularly, the stream is shown at the axial stage of the turbomachine corresponding to the intermediate case 12. The intermediate case 12 is a wheel arranged about the axis (not shown) of the turbomachine, in axial continuity with the other annular elements of the turbomachine. The intermediate case 12 has an adapted structure and sufficient stiffness to be a structural holding part of the turbomachine. It comprises a central hub 14 forming the internal limit of the stream 10, with an external shroud (not shown) forming the external limit of the stream 10, and with radial arms 100 connecting the hub with the shroud. Such arms 100 are generally cast so that they have sufficient stiffness. Besides, such arms 100 inevitably affect the flowing of air through the stream 10 and are thus designed with an aerodynamic configuration.

In order to link different pieces of equipment located inside the stream 10, such as sensors, computers, control means, combustion, lubrication or cooling systems, with the external environment of the turbomachine, elements having an elongated shape 20, i.e. for example assemblies, corresponding to sets of one or more, for example electric cables, or pipes, must be laid for the radial flowing of a fluid such as air, fuel-oil or oil, through the stream 10 of the turbomachine.

Forming the arms 100 so that they comprise each a cavity 102 for the passage of the elements having an elongated shape 20 extending radially inside the arm 100 is known from the prior art. In order to access the cavity with a view to mounting the elements having an elongated shape inside the arm, the prior art proposes to provide a trap door 104 giving access to the cavity 102 inside the arm 100. Such a trap door 104 affects the aerodynamic integration of the arm 100 into the stream 10, since it stops the continuity of the arm surface. For the same reason, such trap door 104 reduces the rigidity of the guide arm and weakens it. The mounting of the trap door, which uses screws 106 integrated into the arm 100, also requires the partial increase of the arm thickness to enable the passage and the positioning of the screws 106. This increases the global mass of the turbomachine in an undesired manner. In order to hold the elements having an elongated shape 20 in the cavity 102, two blocks 108, 110 are arranged in the cavity, with one 108 being fixed to a wall 112 of the arm facing the trap door 104, and the other one 110 being fixed to the trap door 104. When the trap door is closed, the two blocks 108, 110 pinch the elements having an elongated shape 20 so that they are held in the cavity 102. Consequently, the mounting of the prior art implies the blind positioning of the elements having an elongated shape between the blocks, with a doubt remaining as regards the correct position thereof, upon closing the trap door.

Figure 2:
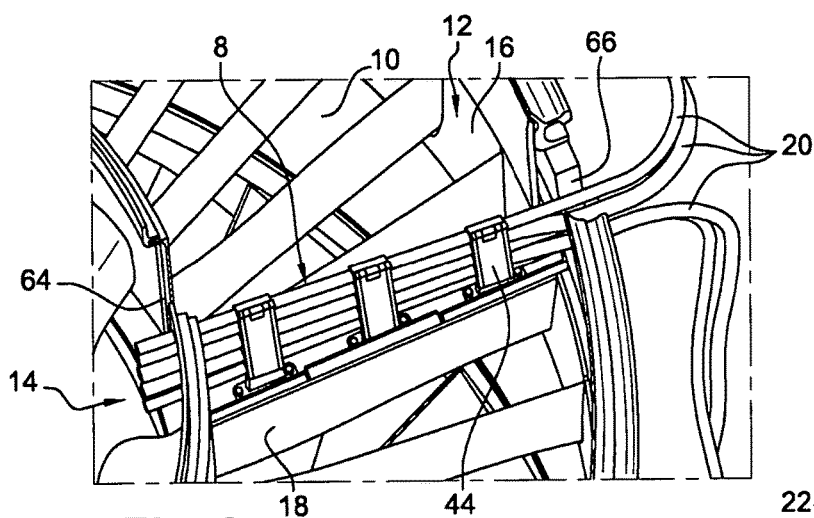
FIG. 2 is a partial perspective view of the stream of a turbomachine wherein a guide arm according to the invention is mounted, with the cover being lifted.
Figure 3:
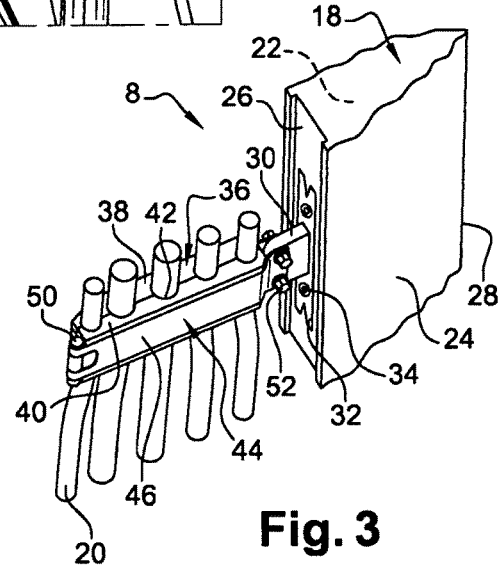
FIG. 3 is a perspective view of a frame section according to the invention as shown in FIG. 2.

The invention proposed, which discloses an arm for guiding elements having an elongated shape 20 can easily be adapted to the arm of an intermediate case. The FIGS. 2 and 3 thus show the invention adapted to the arm of an intermediate case in the stream of a turbomachine, such as a turbojet engine or a turboprop engine.

In greater details, the arm of an intermediate case concerned generally comprises a solid beam 18, which may be hollow to reduce the weight of the cast assembly, and radially extended between the hub 14 forming the internal limit of the stream 10 at the stage defined by the intermediate case 12 and the external shroud 16 of the intermediate case forming the external limit of the stream 10 at the same stage. Such beam comprises three radially extending faces 22, 24, 26 two faces 22, 24 of which are joined upstream in a leading edge 28, and extend downstream while gradually spacing apart. Both upstream faces are so designed as to provide a deflection, without any disturbance, of the air flow circulating in the stream 10 in the downstream direction, on either side of the arm. The downstream ends of both upstream faces 22, 24 are linked by a third downstream face 26, substantially perpendicular to the axis of the turbomachine.

Lugs 30 are integral with the downstream face 26 of the beam and radially aligned along same, with each lug 30 extending radially and in the downstream direction from the downstream face 26 of the beam. More specifically, each lug 30 is formed integral with a flat base 32 which radially extends on a small distance outside and inside the lug 30, with such base comprising holes 34 for the passage of fixing screws on the downstream face 26 of the beam.

The various elements having an elongated shape 20 radially going through the stream 10 are accommodated in members for the passage 36 of elements having an elongated shape, in such a way as to be axially aligned relative to one another. Each member for the passage 36 of elements comprises a couple of blocks 38, 40 for instance made of elastomer or thermoplastics, with each block 38, 40 comprising a series of semi-cylindrical ripples 42 on one surface. In a form-fitting manner, between the two substantially symmetrical blocks 38, 40, and when the two circumferentially opposite blocks 38, 40, are tightened together, the two series of ripples 42 form only one series of cylindrical holes oriented substantially radially, axially aligned and holding the elements having an elongated shape 20 closely tight.

A collar 44, for instance made of metal, holds each member for the passage 36 of elements having an elongated shape 20 tight, and is fixed to a matching lug 30. More particularly, each collar 44 consists of two rigid strips 46, 48 axially extending on either side of a member for the passage 36 of elements having an elongated shape, while complying with the shape of the member for the passage 36 of elements.

These two rigid strips 46, 48 are linked at their downstream ends thereof about a radial rod 50 in such a way as to enable the relative rotation of the two strips 46, 48 about the axis of the rod 50. The upstream ends of the two strips 46, 48 comprise two holes for the passage of screws 52 cooperating respectively with two side through-holes of the lug, for a relative bolted fixing. Thus, when the lug 30 and the upstream ends of the strips 46, 48 are circumferentially tightened together, the two blocks 38, 40 composing each member for the passage 36 of elements having an elongated shape are tightly held together by the strips 46, 48, and hold the elements having an elongated shape 20 in the cylindrical holes.

The assembly described above and comprising the beam 18, the lugs 30, the member for the passage 36 of elements and the collar 44, thus compose the frame 8 according to the invention.

Figure 4:
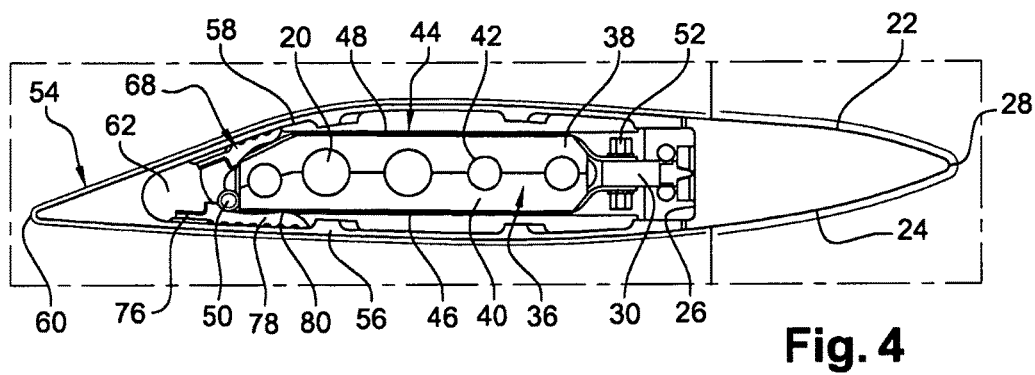
FIG. 4 is a cross-sectional view of the guide arm according to a first embodiment of the invention, in a plane perpendicular to the longitudinal direction.
Figure 5:
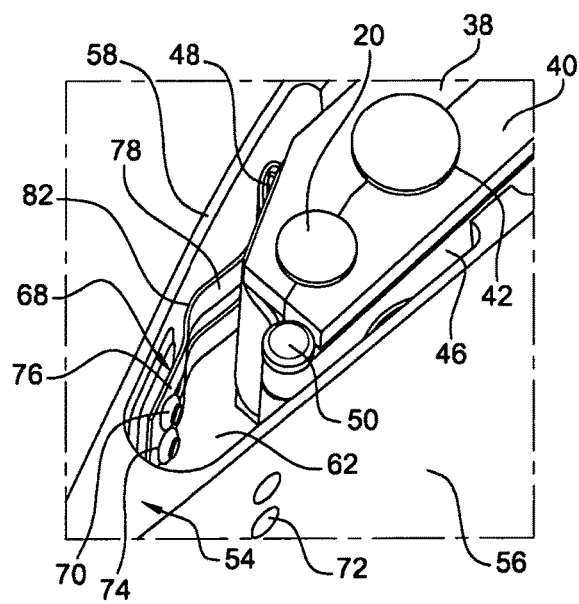
FIG. 5 is a perspective view of the guide arm according to a second embodiment of the invention.

Reference is now made to FIGS. 4 and 5. In order to protect the elements having an elongated shape 20 and the members for the passage 36 of the air flow circulating through the stream 10, the invention thus proposes to provide for a cover 54 resting on the beam 18 from downstream. Such cover 54 radially extends between the internal and the external limits of the stream 10, axially opposite the beam 18 of the intermediate case 12. It comprises two radial walls 56, 58 joined downstream in a trailing edge 60 and extending upstream and on either side of the members for the passage 36 of the elements having an elongated shape 20, while being typically mutually spaced by 20 to 40 mm maximum. The upstream ends of the two radial walls 56, 58 of the cover 54 rest on the downstream face 26 of the beam 18 of the intermediate case 12 and respectively aligned with the two upstream faces 22, 24 of the beam 18. With this arrangement, the guide arm comprising the beam 18 and the cover 54 forms an inner cavity 62 which extends radially and is limited upstream by the downstream face 26 of the beam 18, and downstream and on the circumference by the radial walls 56, 58 of the cover. The elements having an elongated shape 20 are radially guided in this cavity 62 which extends through the stream 10 and go through openings 64, 66 formed within the internal and external annular limits of the stream 10 and radially aligned with the cavity 62. Moreover, the alignment of the radial walls 56, 58 of the cover and the upstream faces 22, 24 of the beam provides for an optimum aerodynamic configuration of the guide arm formed which extends in the stream.

In the environment shown in the figures, the cover 54 corresponds to a Kit Engine arm. The Kit Engine is a wheel axially arranged in continuity with the intermediate case, so as to structurally complete the latter. In the context of the invention, it makes it possible to form the downstream part of the guide arm corresponding to the cover 54.

In operation, the rotating elements of the turbomachine cause vibrations. Such vibrations are propagated by the beam 18 of the intermediate case to the members for the passage 36 of the elements having an elongated shape, all the more so since the downstream ends thereof are cantilevered relative to the upstream fixing thereof to the lugs 30. Risks of friction and collision thus exist in operation, between the members for the passage 36 of the elements having an elongated shape and the radial walls 56, 58 of the cover, typically spaced by a distance ranging from 3 to 6 mm, which obviously entails a risk of wear which might cause the breaking of the holding means. In order to remedy this problem, and with reference to FIGS. 4 to 6, the invention provides for arranging pre-stressed shock-absorbing means 68 inside the cavity 62 between the radial walls 56, 58 of the cover and the members for the passage 36 of the elements having an elongated shape. Preferably and as shown, the downstream ends of the members for the passage 36 of the elements having an elongated shape, tightened by the collars 44, are each, circumferentially damped on either side by two shock-absorbing means 68 respectively, fixed to the radial walls 56, 58, respectively. During mounting, the cover 54 is axially brought in the upstream direction against the beam 18. The shock-absorbing means 68 fixed beforehand on the radial walls 56, 58 are then also used as centering and pre-stressing means for the downstream ends of the members for the passage 36 of the elements having an elongated shape in the cavity 62 formed. No additional step of adjustment of the elements having an elongated shape 20 in the cavities 62 is thus required.

The space available between the radial walls 56, 58 of the cover may not enable the passage of mounting tools. The invention thus proposes to fix the shock-absorbing means 68 using blind rivets 70 inserted through holes 72 in the radial walls 56, 58 aligned with holes 74 in the shock-absorbing means. The heads of the blind rivets 70 are so ground that they are flush with the surfaces of the walls 56, 58, in order not to affect the circulation of the air flow in the stream 10.

In FIG. 4, the shock-absorbing means 68 are pads made of a flexible material such as elastomer, specifically silicone. Such pads, which rest on the radial walls of the cover, each comprise a downstream part 76 gone through by the fixing blind rivets 70 and an upstream part 78 inserted between one of the walls 56, 58 and the collar 44 of a member for the passage 36 of the elements having an elongated shape. In order to prevent any wear of the pads, these are coated with a friction-resistant material such as polytetrafluoroethylene (PTFE) fabric, i.e. the material known under the brand name Téflon® 80 in the vicinity of the contacts with the collar 44 surrounding the member for the passage 36 of the elements having an elongated shape.

Figure 6:
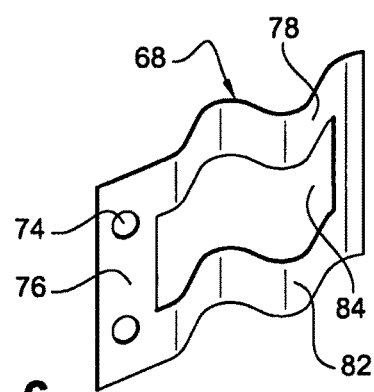
FIG. 6 is a perspective view of a damping metal sheet intended to be integrated in the guide arm according to the second embodiment of the invention.

In another embodiment shown in FIGS. 5 and 6, the shock-absorbing means 68 are formed with rippled metal sheets and extend along the respective radial walls 56, 58 of the cover. Such rectangular-shaped metal sheets have rectilinear peaks 82 oriented radially in the cavity. The downstream part 76 of each sheet is fixed to a radial wall 56, 58, whereas the upstream part 78 of the sheet rests against said wall through some of the peaks 82, and rests against a collar 44 surrounding a member for the passage 36 of the elements having an elongated shape through the opposite peaks 82. The ripples of the sheet are crushed in operation so as to damp the vibrations. The sheet stiffness in support position typically ranges from 0.1 ton/meter to 10 ton/meter. To increase flexibility and save mass in the sheet, the invention proposes to cut the latter, for instance, making a rectangular hole 84 centred in the sheet, so as to eventually obtain a metal frame with ripples.

It is important to note, too, that the description above, which describes the guide arm which is the object of the invention mounted in the stream of a turbomachine according to a specific orientation with respect to the axis, i.e. with the frame upstream of the cover, can easily be adapted to the mounting in the stream axially in the reverse direction, i.e. with the frame downstream of the cover. The aerodynamic configuration of the guide arm could then be easily modified to comply with the constraints of integration into the stream.

Besides, the result of the above disclosure and description of the invention, is that the guide arm according to the invention is absolutely not necessarily limited to the environment of a turbomachine and one of the circulation stream thereof, but may operationally be integrated into all kinds of environment, such as an open space, a conventional circular stream, a space separating two parallel walls, etc.

The invention claimed is:

1. A guide arm for guiding at least one element having an elongated shape, with said arm extending in a substantially longitudinal direction between two ends, comprising an inner cavity opening on the outside of the arm at each of the ends thereof, and being adapted to accommodate at least one element having an elongated shape extending substantially longitudinally in the cavity, wherein said arm consists of two parts extending substantially longitudinally and opposite each other, one of the two parts is a frame comprising a substantially longitudinal beam linked to frame holding means for holding the elements having an elongated shape on the outside and along the beam, and the other one of the two parts is a cover comprising substantially longitudinal walls which cover the frame holding means, and are engaged with the beam, in such a way as to form the inner cavity in which the elements having an elongated shape extend, with shock-absorbing means being arranged pre-stressed between the frame holding means for holding the elements having an elongated shape, and the longitudinal walls, in such a way as to reduce and damp the movements of the frame holding means for holding in the cavity.

2. A guide arm according to claim 1, wherein the shock-absorbing means comprise elastomer pads fixed to the longitudinal walls of the cover, and coated with a friction-resistant material in the vicinity of the contact with the frame holding means.

3. A guide arm according to claim 1, wherein the shock-absorbing means comprise rippled metal plates fixed to the longitudinal walls of the cover, and the ripple peaks of which rest, on one side, against the longitudinal walls of the cover and, on the other side, against the frame holding means.

4. A guide arm according to claim 1, wherein the shock-absorbing means are fixed to the longitudinal walls of the cover using blind rivets.

5. A guide arm according to claim 1, wherein the frame holding means comprise at least one member for the passage of elements having an elongated shape comprising holes for the passage of elements having an elongated shape oriented substantially longitudinally, and which is held tight about the elements having an elongated shape by a collar surrounding said member for the passage of elements having each an elongated shape, with said collar being fixed to a lug of a plurality of lugs defining at least some of the frame holding means, said lug extending from the beam.

6. A guide arm according to claim 5, wherein said plurality of lugs are substantially aligned along the beam and are, each, fixed to a collar tightening a member for the passage of the elements having an elongated shape, in such a way as to guide the elements having an elongated shape along the guide arm.

7. An assembly consisting of a guide arm according to claim 5, and of at least one element having an elongated shape, wherein the guide arm has an aerodynamic configuration for the flowing of a fluid in the downstream direction of the guide arm, substantially perpendicularly to the longitudinal direction, with upstream the guide arm consisting of the frame, said frame being provided with some of said plurality of lugs which extend longitudinally and in the downstream direction, from downstream of the beam, with the elements having an elongated shape being aligned in the downstream direction in the passage members arranged downstream of the lugs, and downstream the guide arm consisting of the cover, the longitudinal walls of which extend in the downstream direction on either side of the members for the passage of the elements having an elongated shape, and are linked to the beam on either side of the lugs, in such a way that the guide arm has two smooth external surfaces, substantially mutually parallel, and joined in two upstream and downstream edges of the guide arm.

8. A turbomachine, comprising a guide arm according to claim 1.

9. A turbomachine, according to claim 8, wherein the guide arm is arranged through a fluid circulation annular stream of the turbomachine, with one of the ends of the guide arm being linked to an inner annular shroud of the stream, and the other end of the guide arm being linked to an outer annular shroud of the stream, in such a way as to guide at least one element having an elongated shape, radially between the inside and the outside of the stream, with the frame being arranged upstream of the cover.

10. The guide arm according to claim 1, wherein each element having said elongated shape elongated shape is a cable assembly.

11. The guide arm according to claim 1, wherein each element having said elongated shape elongated shape is a pipe.

* * * * *